United States Patent [19]

Vinz

[11] Patent Number: 4,735,065
[45] Date of Patent: Apr. 5, 1988

[54] PROCESS AND ARRANGEMENT FOR ENERGY-SAVING AUTOMATIC MAINTENANCE OF THE CONCENTRATION OF BOILING COOLANT MIXTURES

[76] Inventor: Peter Vinz, Paosostrasse 24a, D-8000 Munich 60, Fed. Rep. of Germany

[21] Appl. No.: 5,593

[22] Filed: Jan. 21, 1987

[30] Foreign Application Priority Data

Jan. 24, 1986 [DE] Fed. Rep. of Germany ....... 3602117
Jun. 12, 1986 [DE] Fed. Rep. of Germany ....... 3619735

[51] Int. Cl.$^4$ ............................................. F25B 15/00
[52] U.S. Cl. ..................................................... 62/476
[58] Field of Search ........................................... 62/476

[56] References Cited

U.S. PATENT DOCUMENTS 4,464,907 8/1984 Mack et al. ........................ 62/476 X

FOREIGN PATENT DOCUMENTS 2044438 3/1972 Fed. Rep. of Germany .

OTHER PUBLICATIONS

W. Iniebergall "Sortion-Kältemaschinen", Berlin-Tegel, Mar. 1959.

Primary Examiner—Lloyd L. King
Attorney, Agent, or Firm—Miller & Gibbons

[57] ABSTRACT

The invention deals with a process for the energy-saving automatic control of the concentration of evaporating coolant mixtures, especially of water-containing ammonia solutions in evaporators of refrigerating machines and heat pumps based on the absorption principle, together with different embodiments for carrying out the process. The process makes possible the combined utilization of the vaporization potential of the solution outflow and the cooling potential of the cold vapor withdrawn for subcooling the condensate feed, while selecting the minimum temperature difference between the subcooled not-yet-depressurized condensate feed and the boiling coolant mixture in the evaporator as the control variable for process automatization. This temperature difference is independent of the saturation pressure of the boiling coolant mixture and can be maintained constant for every evaporator load point to obtain an energy-saving solution outflow. Finally, the concentration of the boiling coolant mixture is maintained with this procedure, and the evaporator operates for every evaporation temperature with the highest possible saturation pressure, almost like a single-substance evaporator.

4 Claims, 2 Drawing Sheets

PROCESS AND ARRANGEMENT FOR ENERGY-SAVING AUTOMATIC MAINTENANCE OF THE CONCENTRATION OF BOILING COOLANT MIXTURES

The invention deals with a process and an arrangement for the energy-saving automatic maintenance of the concentration of boiling coolant mixtures, especially of water-containing ammonia solutions in evaporators of refrigeration machines and heat pumps based on the absorption principle, by which condensate feed to the evaporator and solution outflow from the evaporator can be set by flow control valves and in which the cold vapor streaming from the evaporator—before its entry into the absorber—passes through a cold vapor cooler, in which the cold vapor becomes heated and where the condensate flowing to the evaporator becomes subcooled before it is depressurized.

Significant plant operational problems are encountered in units of this type because the evaporation temperature drifts; this drift is dependent on concentration during isobaric vaporization of mixed coolants [or coolant mixtures]. Concentration shifts are inherent in vaporizing coolant mixtures; these depend in the final analysis on mass and concentration non-equilibria in the streams which are flowing into and out of the evaporator.

As is well known, the concentration-dependent drifting of evaporation temperature can be avoided by dewatering the evaporator; for this, a definite quantity of the liquid boiling coolant mixture is taken from the evaporator as solution outflow and replaced with an equally large quantity of condensate having a higher ammonia concentration. This amount of liquid outflow needed can be calculated relatively simply for each loading point of the coolant mixture evaporator. The problem, on the contrary, is in achieving this industrially, especially with changing evaporator outputs and saturation vapor pressures.

It is known that dewatering a coolant evaporator can be achieved by using a manually-operated valve, located in a connecting pipe between the evaporator and the absorber, and by which the liquid outflow from the evaporator can be set either on a batch basis—by exceeding a given boiling point elevation—or can be set for continuous flow (Handbuch der Kältetechnik [Refrigeration Handbook], Volume 7, published by Springer Verlag, 1959, page 58).

Accurate metering of solution outflow to meet the requirements is not possible, however, using such a manual dewatering arrangement. Whereas the evaporator transfer capacity decreases—despite evaporation pressure remaining constant—for too low a solution outflow, a portion of the useful coolant will be withdrawn from the evaporator with too high a solution outflow.

Moreover, a process—as well as an automatic dewatering arrangement—is disclosed in German patent No. 2,044,438 with whose help the dewatering of the coolant evaporator can be controlled continually while meeting its requirements, by means of which these plant operational problems can be overcome.

The controlling variable used for proper control of solution outflow in this automatic dewatering arrangement is either the difference between the saturation temperature of the depressurized condensate feed entering the evaporator and the saturation temperature of the solution outflow being withdrawn from the evaporator, or the difference between the evaporator pressure and the pressure of the pure coolant in a reference vessel at the temperature of the solution outflow being withdrawn. This temperature or pressure difference is maintained constant at a given pre-selected value by means of the control device over the entire evaporator operating range.

In all of these dewatering arrangements, however, the solution outflow is withdrawn from the evaporator without utilizing its heat of vaporization via either the manually- or automatically-operated solution flow control valve into the absorber, and this represents an energy loss for the overall process.

The invention is intended to improve this condition. It aims to solve the problem of creating an automatic dewatering arrangement for the evaporator which will always maintain liquid outflow at the required point for all loads, load variations, and changes in other conditions of the absorption refrigeration machine, and, moreover, will completely utilize the cooling potential of the solution outflow for subcooling the condensate feed which is maintained under liquefaction pressure, and thus to operate finally in a manner free of energy loss.

This problem is solved according to the invention by the characteristic features shown in the embodiments of the invention.

An advantageous embodiment of this energy-saving automatic maintaining of concentration can be achieved according to the invention, if a vaporization cooler (5.1) is connected in parallel with the condensate side of cold vapor cooler (4) and a vaporization cooler (5.2) is connected in series with it and that boiling solution outflow from evaporator (1) passes through both vaporization coolers (5.1, 5.2), whereby flow control valve (6) is positioned between evaporator (1) and vaporization cooler (5.2), whose operation is controlled by controller (8) to maintain a minimum temperature difference between subcooled, not-yet-depressurized, condensate feed ($T_K$) and not-yet-warmed cold vapor outflow ($T_V$).

Another advantageous embodiment according to the invention involves passing the boiling solution withdrawn from evaporator (1) first through vaporization cooler (5.2), connected in series with cold vapor cooler (4), and then through vaporization cooler (5.1), connected in parallel with cold vapor cooler (4), whereby cold vapor cooler (4) and vaporization cooler (5.1), connected in parallel with it, divide [or share] the total quantity of condensate feed to evaporator (1) while the total amount flows through vaporization cooler (5.2) connected in series.

A preferred embodiment of the invention, intended for use in refrigerating plants, involves connecting a fresh water cooler in parallel with cold vapor cooler (4) whereby all coolers connected in parallel share the total quantity of condensate feed while vaporization cooler (5.2) connected in series, on the contrary, takes the total quantity of condensate feed.

The process engineering combination which underlies this invention demonstrates that the minimum temperature difference between subcooled, not-yet-depressurized, condensate feed and boiling coolant mixture in the evaporator are suitable variables for maintaining evaporator concentration, since this temperature difference is independent of the saturation pressure of the boiling coolant mixture and depends only slightly on evaporator output. As long as the subcooling of the condensate feed and the vaporization potential of the solution outflow are in balance, their use is, moreover, free of energy loss. Depending on equipment cost, the actual minimum temperature difference value can range between 2 and 10 K. Its measurement and properly controlled treatment have favorable cost and are operationally safe.

The minimum temperature difference used without energy loss is obtained for a defined, i.e., the actually required, solution outflow from the evaporator. This is, again, only dependent on the amount of condensate subcooling, and it changes with this amount; i.e., for every actual solution outflow requirement, a corresponding coolant mixture concentration results in the evaporator, which is maintained by means of the minimum temperature difference.

BRIEF DESCRIPTION OF THE DRAWINGS

In FIG. 2, the numbers corresponds to the following items:

| Numerals | Legend Items |
|---|---|
| 1 | evaporator |
| 2 | condenser |
| 3 | absorber |
| 4 | cold vapor cooler |
| 5.1 | vaporization cooler |
| 5.2 | vaporization cooler |
| 6 | solution outflow valve |
| 7 | condensate let down valve |
| 8 | controller |

The invention will be explained further by reference to FIGS. 1 and 2.

Figure 1:
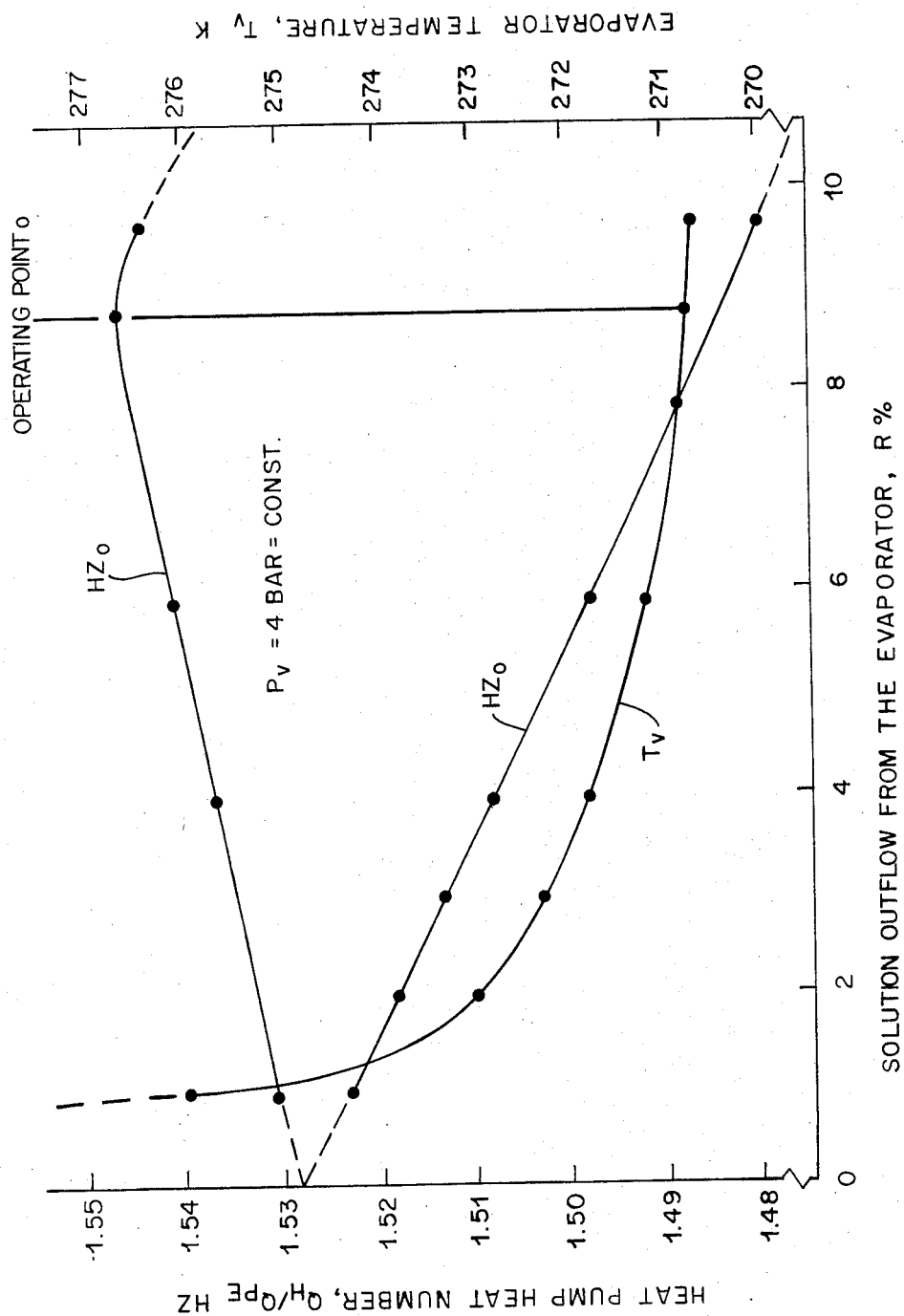
FIG. 1 is graph showing heat pump heating number as a function of evaporator operating conditions.

FIG. 1 shows, according to the teachings of the invention, the heating number curve for an NH$_3$-water absorption heat pump plotted against the percent solution outflow from the evaporator, once with (HZ$_\phi$) and once without (HZ$_0$) supplemental utilization of the solution outflow vaporization potential for subcooling the condensate feed. Both curve branches have a common beginning point, but their subsequent courses are different. The theoretical heating number decreases steadily with increasing solution outflow as expected in a contemporary plant, i.e., by utilizing only the cooling potential of the cold vapor outflow; with supplemental utilization of vaporization potential, it increases steadily with solution outflow until the heat exchange limit is attained, i.e., the minimum temperature difference between condensate feed and boiling coolant mixture in the evaporator. The excess vaporization potential is not utilized with further increase in solution outflow, and the heating number must fall again, as a consequence. At the operating point, with proper setting of solution outflow, the heating number is about 4% higher with supplemental utilization of vaporization potential than it is with customary condensate subcooling.

In addition, FIG. 1 shows the course of boiling temperature T$_V$ at constant evaporator pressure, plotted against solution outflows in percent. A further advantage of the invention is displayed here. The maximum heating number is attained specifically at the lowest possible boiling temperature for this evaporator pressure. Or, stated otherwise in a completely general manner, for every possible pre-set evaporation temperature, the heating number maximum corresponds to the most suitable operating saturation pressure in the evaporator. This behavior proves itself to be particularly favorable for heat pumps, whose hot water temperatures react, as is known, very sensitively to pressure reductions in the coolant mixture evaporator.

Figure 2:
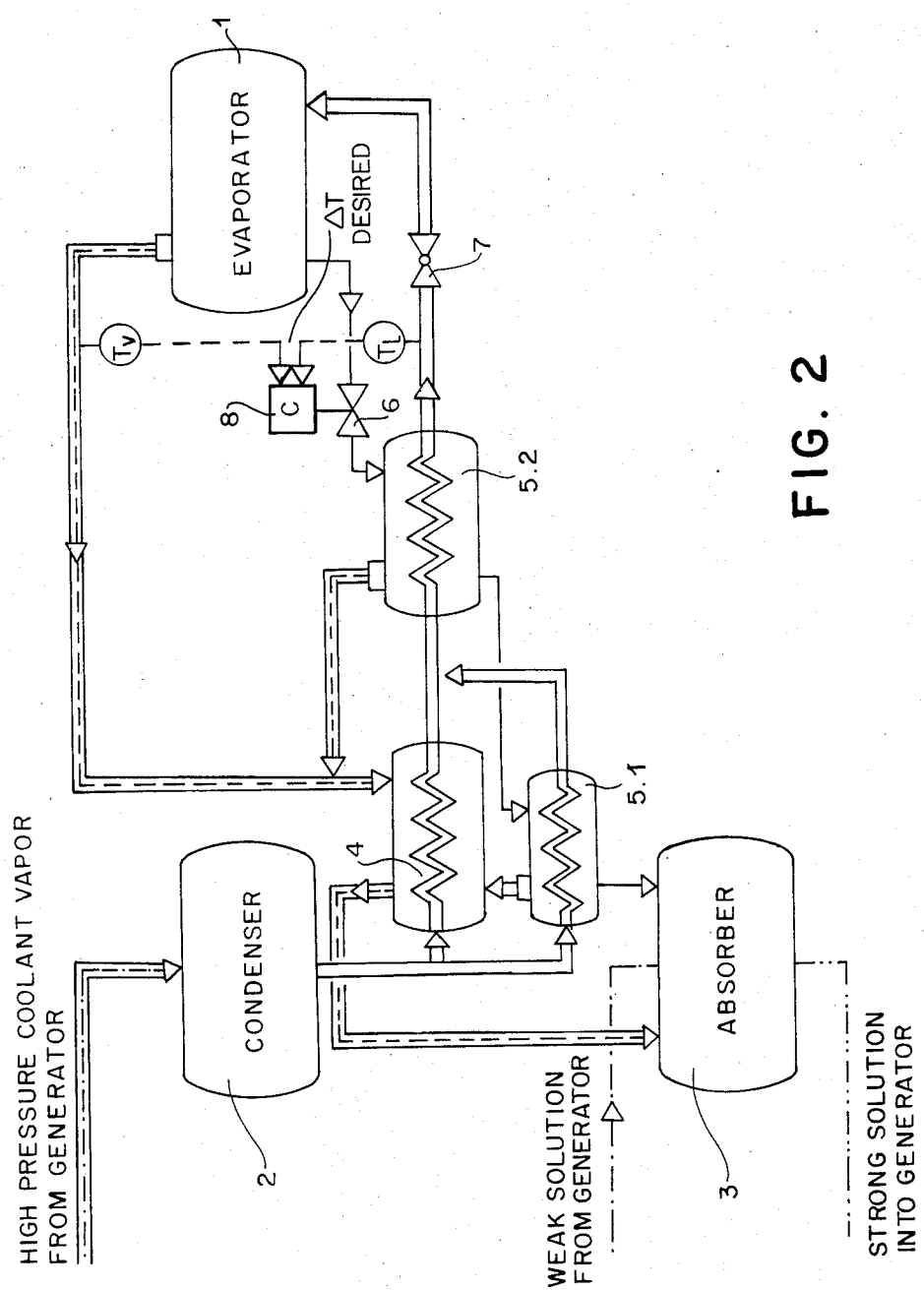
FIG. 2 is a process flow sheet showing concentration control for coolant mixture evaporator.
Figure 1:
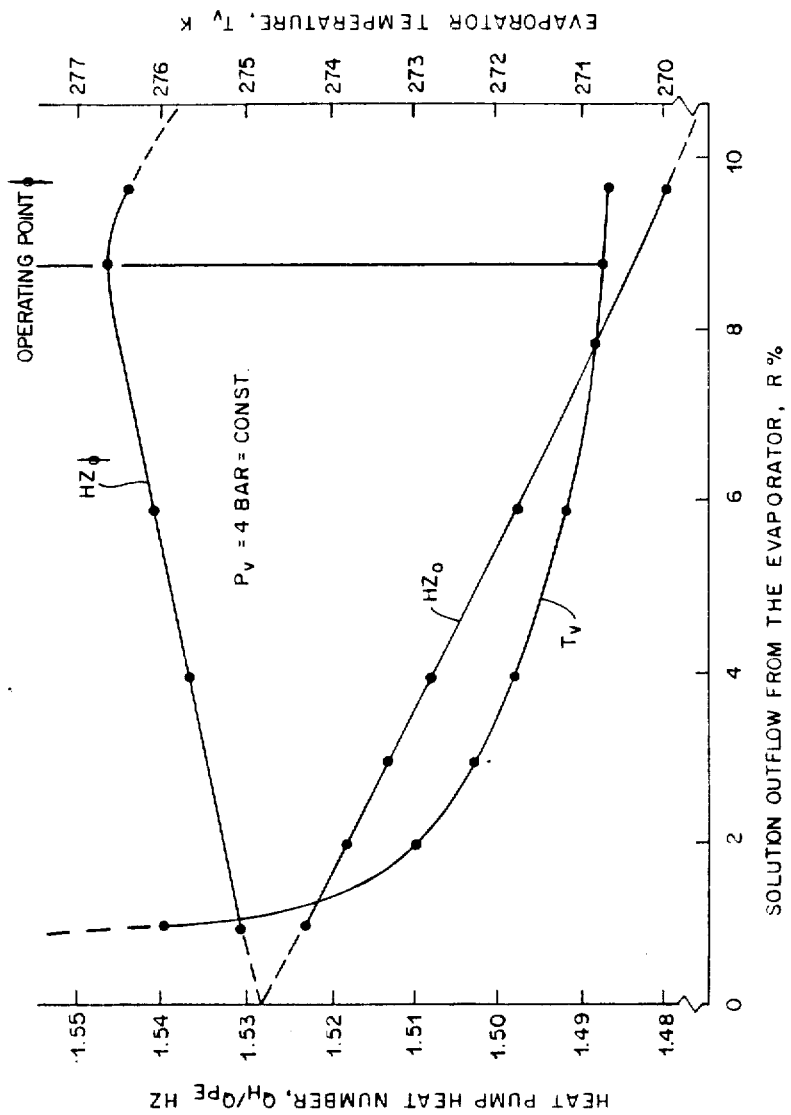
Figure 2:
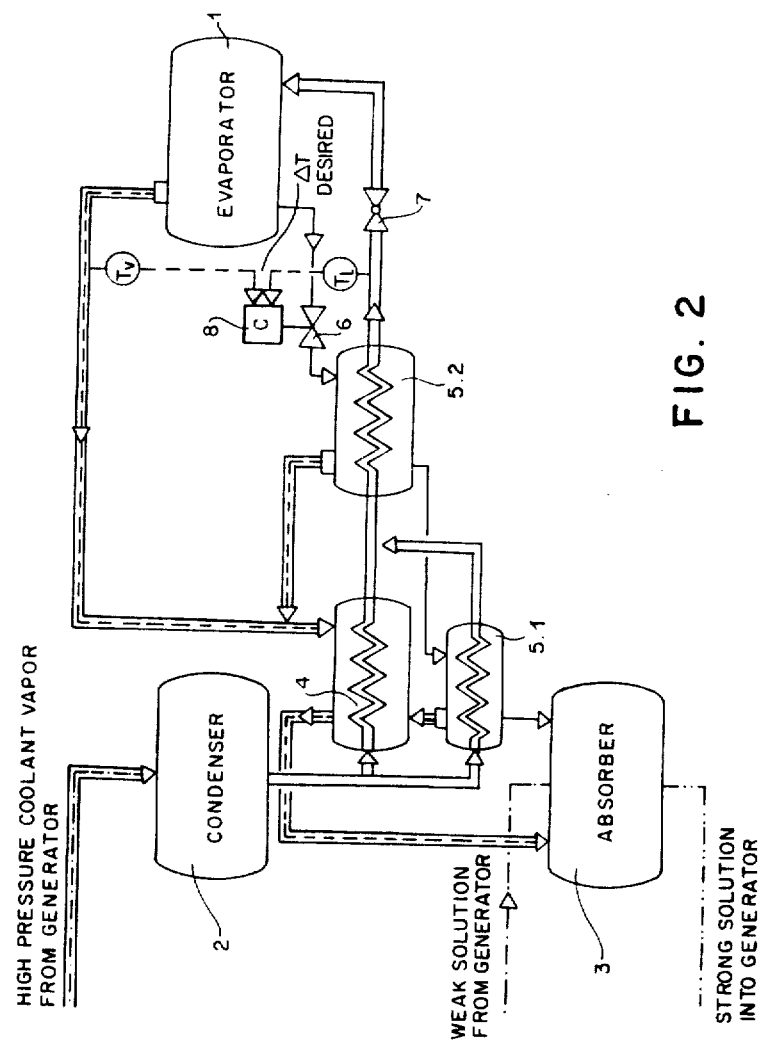

FIG. 2 shows an illustrative example of the process for an ammonia/water absorber heat pump. Here it proves advantageous if the vaporization cooler is divided into two vaporization coolers (5.1, 5.2) with appropriately divided heat exchange surfaces, whereby, according to FIG. 2, vaporization cooler (5.1) has its condensate side in parallel with cold vapor cooler (4) while vaporization cooler (5.2) is connected into the mair condensate feed line after the pre-cooled partial streams are combined.

The boiling solution outflow from coolant mixture evaporator (1) passes through flow control valve (6) first into vaporization cooler (5.2), where it is partly evaporated. The residual solution outflow then goes into vaporization cooler (5.1), where it is vaporized as much as possible; only a residual solution flow of less than 0.5% finally remains, at nearly the absorber solution concentration, to flow into absorber (3).

The vapor outflow stream from coolant mixture evaporator (1) and from vaporization cooler (5.2) are passed to cold vapor cooler (4) where they enter the shell side countercurrent to the partial stream of condensate feed. Vapor taken from vaporization cooler (5.1) can either be led directly to absorber (3), or can be fed in addition into cold vapor cooler (4).

The condensate feed can be cooled with this heat exchanging circuit before being depressurized in condensate let-down valve (7) to a minimum residual temperature elevation of 4–5 K, based on the boiling temperature of the coolant mixture in evaporator (1).

The temperature difference between condensate feed upstream of let-down valve (7) and cold vapor flowing from coolant mixture evaporator (1) is measured at temperature measuring points T$_V$ and T$_K$. This temperature difference should be held at a minimum by controller (8) operating on the quantity of flow in solution outflow valve (6) over the entire partial load region of the evaporator.

The fundamental principle of this control applies in the same manner to absorption heat pumps as to absorption refrigeration units. In water-cooled refrigerating units, a supplemental fresh water cooler can be connected in parallel to the condensate side to produce a reduction in solution outflow, and thus further improve the heat ratio.

I claim:

1. A process for the automatic energy-saving maintaining of concentration of evaporating coolant mixtures, especially of water-containing ammonia solutions in evaporators of refrigerating machines and heat pumps operated according to the absorption principle, whereby condensate feed to the evaporator and solution outflow from the evaporator to the absorber can be set by flow control valves and the cold vapor leaving the evaporator before entry into the absorber passes through a cold vapor cooler in which the cold vapor is warmed and the condensate flowing to the evaporator is subcooled before it is depressurized, characterized by evaporating the solution outflow from the evaporator before entry into the absorber as much as possible by heating using condensate feed, so the temperature of the subcooled, still-not-depressurized condensate feed to the evaporator and the boiling temperature of the coolant mixture in the evaporator are measured and that the flow control valve automatically controls the solution outflow to provide a minimum difference between these two temperatures.

2. An arrangement for performing the process of claim 1, characterized by connecting vaporization cooler (5.1) in parallel with the condensate side of cold vapor cooler (4) and connecting vaporization cooler (5.2) in series with it and where the boiling solution outflow from evaporator (1) flows through both vaporization coolers (5.1, 5.2.), whereby flow control valve (6) is arranged bewteen evaporator (1) and vaporization cooler (5.2) whose operation is controlled by controller (8) to maintain a minimum temperature difference between subcooled and not-yet-depressurized condensate feed ($T_K$) and the not-yet-heated cold vapor outflow ($T_V$).

3. An arrangement according to claim 2, wherein the boiling solution outflow from evaporator (1) first flows through vaporization cooler (5.2) connected in series with cold vapor cooler (4) and then flows through vaporization cooler (5.1) connected in parallel with cold vapor cooler (4), whereby cold vapor cooler (4) and vaporization cooler (5.1) connected in parallel with it share partial amounts of the total quantity of condensate being fed to evaporator (1) while the total quantity flows, on the contrary, through cooler (5.2) connected in series.

4. An arrangement according to claims 2 or 3, wherein a fresh water cooler is connected in parallel with cold vapor cooler (4), whereby all coolers connected in parallel share portions of the condensate feed, while vaporization cooler (5.2) connected in series, on the contrary, takes the entire quantity of condensate being fed to evaporator (1).

* * * * *

UNITED STATES PATENT AND TRADEMARK OFFICE
CERTIFICATE OF CORRECTION

PATENT NO. : 4,735,065

DATED : April 5, 1988

INVENTOR(S) : Peter Vinz

It is certified that error appears in the above-identified patent and that said Letters Patent is hereby corrected as shown below:

The title page should be deleted to appear as per attached title page.

The sheets of Drawings consisting of Figures 1 and 2 should be deleted to appear as per attached sheets.

Signed and Sealed this

Twenty-third Day of August, 1988

Attest:

DONALD J. QUIGG

*Attesting Officer*  *Commissioner of Patents and Trademarks*

United States Patent [19]

Vinz

[11] Patent Number: 4,735,065
[45] Date of Patent: Apr. 5, 1988

[54] PROCESS AND ARRANGEMENT FOR ENERGY-SAVING AUTOMATIC MAINTENANCE OF THE CONCENTRATION OF BOILING COOLANT MIXTURES

[76] Inventor: Peter Vinz, Paosostrasse 24a, D-8000 Munich 60, Fed. Rep. of Germany

[21] Appl. No.: 5,593

[22] Filed: Jan. 21, 1987

[30] Foreign Application Priority Data

Jan. 24, 1986 [DE] Fed. Rep. of Germany ....... 3602117
Jun. 12, 1986 [DE] Fed. Rep. of Germany ....... 3619735

[51] Int. Cl.⁴ ............................................. F25B 15/00
[52] U.S. Cl. .................................................... 62/476
[58] Field of Search ....................................... 62/476

[56] References Cited

U.S. PATENT DOCUMENTS 4,464,907 8/1984 Mack et al. .................. 62/476 X

FOREIGN PATENT DOCUMENTS 2044438 3/1972 Fed. Rep. of Germany.

OTHER PUBLICATIONS

W. Iniebergall "Sortion-Kältemaschinen", Berlin-Tegel, Mar. 1959.

*Primary Examiner*—Lloyd L. King
*Attorney, Agent, or Firm*—Miller & Gibbons

[57] ABSTRACT

The invention deals with a process for the energy-saving automatic control of the concentration of evaporating coolant mixtures, especially of water-containing ammonia solutions in evaporators of refrigerating machines and heat pumps based on the absorption principle, together with different embodiments for carrying out the process. The process makes possible the combined utilization of the vaporization potential of the solution outflow and the cooling potential of the cold vapor withdrawn for subcooling the condensate feed, while selecting the minimum temperature difference between the subcooled not-yet-depressurized condensate feed and the boiling coolant mixture in the evaporator as the control variable for process automatization. This temperature difference is independent of the saturation pressure of the boiling coolant mixture and can be maintained constant for every evaporator load point to obtain an energy-saving solution outflow. Finally, the concentration of the boiling coolant mixture is maintained with this procedure, and the evaporator operates for every evaporation temperature with the highest possible saturation pressure, almost like a single-substance evaporator.

4 Claims, 2 Drawing Sheets

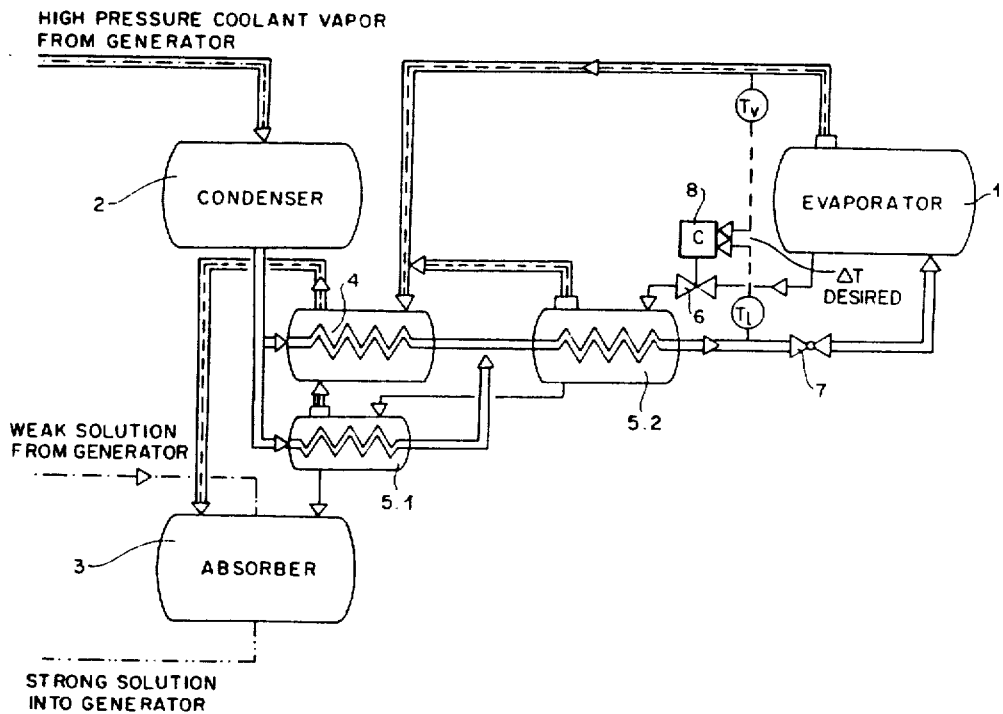

UNITED STATES PATENT AND TRADEMARK OFFICE
CERTIFICATE OF CORRECTION

PATENT NO. : 4,735,065
DATED : April 5, 1988
INVENTOR(S) : Peter Vinz

It is certified that error appears in the above-identified patent and that said Letters Patent is hereby corrected as shown below:

On the title page under "Other Publication", "Iniebergall" should read -- Niebergall --; "Sortion" should read -- Sorption --.

Signed and Sealed this

Twenty-seventh Day of September, 1988

Attest:

DONALD J. QUIGG

Attesting Officer

Commissioner of Patents and Trademarks